United States Patent
Duff et al.

(10) Patent No.: US 6,454,624 B1
(45) Date of Patent: Sep. 24, 2002

(54) ROBOTIC TOY WITH POSABLE JOINTS

(75) Inventors: David G. Duff, Woodside, CA (US); Mark H. Yim, Palo Alto, CA (US); Samuel B. Homans, Oakland, CA (US); Kimon D. Roufas, Mountain View, CA (US); John W. Suh, Palo Alto, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/938,924

(22) Filed: Aug. 24, 2001

(51) Int. Cl.⁷ .............................................. A63H 33/04
(52) U.S. Cl. ........................ 446/91; 414/915; 446/94; 446/93; 446/484
(58) Field of Search ................. 901/28, 9, 15; 414/915; 700/249; 446/91, 94, 93, 484, 175

(56) References Cited

U.S. PATENT DOCUMENTS

| | | | | | |
|---|---|---|---|---|---|
| 4,391,060 A | * | 7/1983 | Nakane | ........................ | 446/94 |
| 4,571,203 A | * | 2/1986 | Murakami | .................... | 446/93 |
| 4,712,184 A | * | 12/1987 | Haugerud | .................... | 446/95 |
| 4,813,907 A | * | 3/1989 | Rissman et al. | ............. | 446/175 |
| 4,993,983 A | * | 2/1991 | Kurita et al. | ................... | 446/94 |
| 5,277,643 A | * | 1/1994 | Ejima | ........................... | 446/91 |
| 5,346,418 A | * | 9/1994 | Arad | ............................ | 446/91 |
| 5,456,568 A | * | 10/1995 | Kirby et al. | ................... | 901/28 |
| 5,699,695 A | * | 12/1997 | Canfield et al. | .............. | 901/28 |
| 5,850,762 A | * | 12/1998 | Kochanneck | ................. | 901/28 |
| 6,071,166 A | * | 6/2000 | Lebensfeld et al. | .......... | 446/175 |
| 6,206,745 B1 | | 3/2001 | Gabai et al. | .................. | 446/91 |
| 6,346,025 B1 | * | 2/2002 | Tachau et al. | ................. | 446/71 |

FOREIGN PATENT DOCUMENTS

| | | |
|---|---|---|
| EP | 0 923 011 A2 | 6/1999 |
| WO | WO 00/45924 | 8/2000 |
| WO | WO 00/45925 | 8/2000 |

* cited by examiner

Primary Examiner—Derris H. Banks
Assistant Examiner—Urszula M Cegielnik
(74) Attorney, Agent, or Firm—Linda M. Robb

(57) ABSTRACT

An assemblage of robotic modules includes a plurality of robotic modules, with each robotic module having memory capability, an actuator, a joint position sensor, and communication means. The assemblage of robotic modules also includes a distributed control unit, which is defined at least in part by a plurality of individual central processing units, with each robotic joint module having at least one central processing unit.

18 Claims, 6 Drawing Sheets

ROBOTIC TOY WITH POSABLE JOINTS

CROSS REFERENCE TO RELATED APPLICATIONS

The following copending applications, U.S. application Ser. No. 09/939,368, filed Aug. 24, 2001, titled "Robotic Toy Modular System", and U.S. application Ser. No. 09/939,186, filed Aug. 24, 2001, titled "Robotic Toy Modular System with Distributed Program", are assigned to the same assignee of the present application. The entire disclosures of these copending applications are totally incorporated herein by reference in their entirety.

This work was funded in part by the Defense Advanced Research Projects Agency (DARPA), Contract #MDA972-98-CA0009. The U.S. Government may have certain rights in this invention.

INCORPORATION BY REFERENCE

The following patents are fully incorporated herein by reference: European Patent Application No. EP 0 923 011 A2 to Fujita et al. ("Robot Systems and Robot Drive-controlling Methods"); International Pat. No. WO 00/45924 to Munch et al. ("A Microprocessor Controlled Toy Building Element with Visual Programming"); U.S. Pat. No. 6,206,745 B1 to Gabai et al. ("Programmable Assembly Toy") and International Pat. No. WO 00/45925 to Munch et al. ("A Programmable Toy with Communication Means").

BACKGROUND OF THE INVENTION

This present invention relates generally to reconfigurable modular robotic systems, and more particularly this invention relates to microprocessor controlled robotic modules which may be reconfigured in multiples in a robotic toy construction system.

Modular robotic systems are those systems that are composed of modules which can be disconnected and reconnected in various arrangements to form a new system enabling new functionalities. This results in multiple possible robot structures for the same number of robotic modules. The user interconnects a certain number of modules to form a desired system based on the task to be accomplished by the system. Such systems tend to be more homogeneous than heterogeneous. That is, the system may have different types of modules, but the ratio of the number of module types to the total number of modules is low. In typical systems, one or more mechanisms, such as robotic arms, or manipulators, may be connected to a control system, which controls the motion and actions in accordance with a task specification and program. The motions may include point-to-point motion, or trajectory tracking motion. Actions may include end-effector control or interfacing to other systems such as tools and machines.

The controller for traditional robotic systems is a centralized unit which is connected to the robotic system through a multi-conductor cable system. Therefore, a system assembled from such modules is modular only in a limited mechanical sense, and its reconfigurability is limited. Because the control system electronics are centralized, the modules cannot be considered as intelligent single units, since they lack dedicated control processors and associated software. In the robotics industry programming by training is accomplished by manually posing backdrivable joints, active compliance of joints, in which the robot actively complies with manual guidance of the joints, or by manual control of the joints through a remote controller.

Robotic systems have also found applications within the toy industry. Toy development has proceeded from simple functions such as the playing of sounds in dolls, performance of simple patterns of movement in robots, to the development of robotic toys with sophisticated patterns of action and a form of behavior.

Toy building elements may perform different physical actions partially through programming the building element and partially by building a structure which consists of interconnected toy building elements of various types. Through a variety in types of building elements, there are numerous possibilities for forming structures and giving the structures various functions. The physical actions of the structures may comprise simple or relatively complex movements controlled by an electric actuator or may include the emission of light or sounds. The toy's physical actions may be conditioned by the interaction of the toy with its surroundings, and the toy may be programmed to respond to physical contact with an object or to light, or possibly sound, and to change its behavior on the basis of the interaction. Such programmable toys are programmed by a central processing unit to make unconditioned as well as conditioned responses. In the toy industry, active joints often have torque-limiting connections between the drive mechanism and the joint in order to protect the drive mechanism from being overdriven and broken and to allow manual positioning even when no power is applied. The joints may or may not be backdrivable.

However, these toys require an external central processing unit programming the elements and directing its movement and also a variety of types of building elements. The object of this invention is to provide a modular robotic toy construction system having active modules, each with its own micro-controller, actuators, input and output devices with posable joints programmed by manually posing the joints and recording a succession of poses.

The following patents illustrate existing modular robotic elements or toys:

European Patent Application No. EP 0 923011 A2 to Fujita et al., titled "Robot Systems and Robot Drive-controlling Methods", teaches a robot system having multiple modules connected to a central processing unit (CPU) which controls overall operation of the assembled robot. The CPU is located in a body unit which also houses a serial bus host, a distributor, random access memory (RAM) and read only memory (ROM) in which is stored a program for making the assembled robot generate a variety of actions. Additional component units are connected to the body unit or to each other and communicate with the body unit through a serial bus. Each component unit includes electronic parts, a connection hub, and memory in which is stored motion information and the characteristic information of the electronic parts of the component unit.

International Patent Application No. WO 00/45924 to Munch et al., tided "A Microprocessor Controlled Toy Building Element with Visual Programming", discloses a programmable toy having a microprocessor which can execute instructions in the form of a program stored in memory. The microprocessor is adapted to control electrical and electro-mechanical units. A display, integrated with the toy, contains icons, each of which represents instructions for the microprocessor, and which can be activated by a user for programming of the microprocessor through a visual user interface.

International Patent No. WO 00/45925 to Munch et al., tided "A Programmable Toy with Communication Means", which teaches a microprocessor controlled toy building element which may be coupled to other building elements. For example, it may be coupled to a separate structure having an actuator and wheels to form a motorized toy vehicle. Each microprocessor executes instructions stored in a memory, which contains subprograms, which may be activated individually by specifying a list of subprogram calls. The toy has a transmitter for communicating instructions to a second toy.

U.S. Pat. No. 6,206,745 B1 to Gabai et al., titled "Programmable Assembly Toy", teaches a programmable assembly toy including both controllable and non-controllable toy elements. The non-controllable elements may be joined to define a structure. The controllable toy elements may interact with the structure and are controlled by a computer control system. The computer control system may be a personal computer equipped with a screen, sound card, hard disk and optionally a CD-ROM drive. A computer radio interface transmits signals via wireless transmission to the controllable toy elements, each of which has a power source, a toy control device, and input and output devices.

SUMMARY OF THE INVENTION

Briefly stated, and in accordance with one aspect of the present invention, there is provided an assemblage of robotic modules for a toy construction system. The assemblage includes a plurality of robotic modules, with each robotic module having memory capability, an actuator, a joint position sensor, communication means, and a central processing unit. The assemblage also includes a distributed control unit, which is defined at least in part by a plurality of individual central processing units, with each robotic joint module having at least one central processing unit.

In accordance with another aspect of the invention, there is provided a method for programming an assemblage of robotic joint modules for a toy construction system. Each robotic joint module includes a central processing unit, memory capability, an actuator, a joint position sensor, and communication means. The assemblage also includes a distributed control unit, which is defined at least in part by a plurality of individual central processing units, with each robotic joint module having at least one central processing unit. A signal is provided to the assemblage to initiate the programming sequence. After the robotic joint modules are moved to selected desired positions, each of the positions for each robotic joint module is stored within the central processing unit of that module. This process is repeated until a desired full sequence of positions is obtained.

In yet another aspect of the invention, there is provided a method for coordinating motions of an assemblage of robotic joint modules for a toy construction system. Each robotic joint module includes a central processing unit, memory capability, an actuator, a joint position sensor, and communication means. The assemblage also includes a distributed control unit, which is defined at least in part by a plurality of individual central processing units, with each robotic joint module having at least one central processing unit Each robotic joint module is programmed with its own sequence of positions. A signal is simultaneously provided to all robotic joint modules in the assemblage. The central processing unit within each of the robotic joint modules interprets the signal and directs the module to execute its own sequence of positions simultaneously with the other robotic joint modules in the assemblage.

In another aspect of the invention, there is provided a method for coordinating motions of multiple assemblages of robotic joint modules for a toy construction system. Each robotic joint module includes a central processing unit, memory capability, an actuator, a joint position sensor, and communication means. Each assemblage of robotic joint modules also includes a distributed control unit, which is defined at least in part by a plurality of individual central processing units, with each robotic joint module having at least one central processing unit. A first assemblage of robotic joint modules is programmed with a sequence of positions. The first assemblage of robotic joint modules provides a signal to the other assemblages of robotic joint modules. The central processing units included within each of the robotic joint modules within the other assemblages of robotic joint modules interprets the signal and directs the other assemblages to execute the sequence of positions.

BRIEF DESCRIPTION OF THE DRAWINGS

The foregoing and other features of the instant invention will be apparent and easily understood from a further reading of the specification, claims and by reference to the accompanying drawings in which:

DETAILED DESCRIPTION OF THE INVENTION

Toy construction systems which contain robotic elements are designed to be used to assemble a single robot controlled by a central processing unit (CPU) which controls one or several actuators, sensors, or other electronic components. These toys are programmed indirectly, either with a computer or a mechanical system such as disks with cut outs. These methods require considerable sophistication and effort and could be accomplished only by advanced users. This invention is a toy construction system that consists of active modules, each of which integrates a microcontroller with components such as actuators, input devices, and output devices. The program controlling the actuators is distributed among the modules, thus facilitating control of the system. It provides a direct and intuitive method for a child to program a complex sequence of motions of a potentially multi-degree of freedom robotic system. Additionally, software in the robotic system could automatically assemble and smooth stop-motion sequences or sets of recorded motions to require even less skill by the user.

A system would typically contain multiple copies of each module, repeated as many times as is necessary to achieve a desired structure. These modules are easily connected to each other by their integrated mechanical and/or electrical connections and are automatically networked together. The system functions as a single connected robot whose behavior may be programmed by manually posing the joints and recording a succession of poses. The robot may play back this recorded succession of poses in the same fashion, faster, slower, or may otherwise alter the user's inputs. The succession of poses may be smoothed by using interpolated joint positions between the poses. Coordination between modules may occur through a single initialization pulse or by network communication between attached modules.

Figure 1:
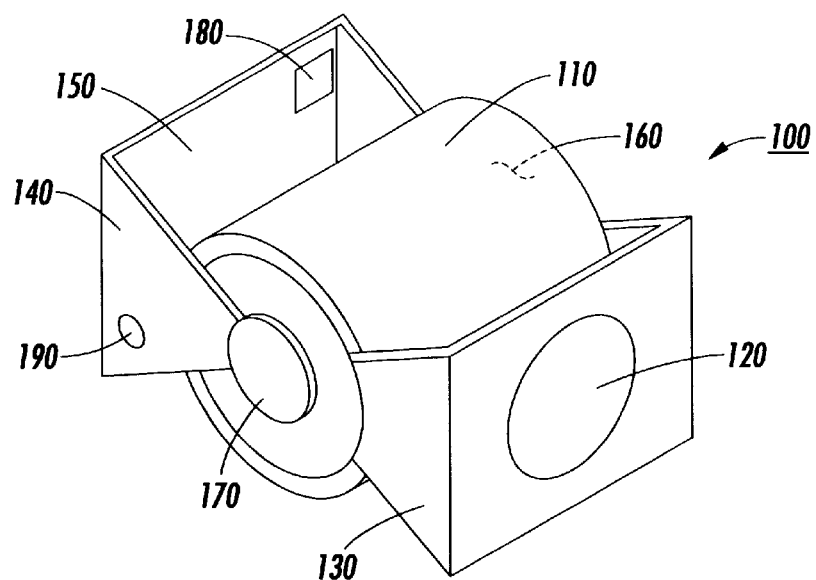
FIG. 1 is a perspective view of one embodiment of a modular element according to the present invention.

Referring to FIG. 1, there is illustrated one embodiment of the robotic modules 100 of the present invention. Each module is identical, having a CPU 180, an actuator 110, joint position sensor 190, and multiple connection ports 120, 150, 160 and 170 integrated into a single unit. Each module may also include a non-backdriveable transmission and torque-limiting clutch, not shown. Supporting structures 130 and 140 house the connection ports, sensors, and CPU. Supporting structure 140 is connected to the output shaft of actuator 110 and may be connected electrically and mechanically to other modules through connection port 150. The remaining connection plates 120, 160, and 170 may function solely as mechanical connection points to other robotic modules 100 or may provide both electrical and mechanical connection points to other robotic modules 100. Connection plates 120, 150, 160 and 170 may advantageously have the same type of connector to permit the interconnection of many module types through any of the connection plates, which permits the assembly of various types of structures. The connectors may also include internal symmetries such that two connection plates may be attached together in multiple ways, for example, two square shaped connectors could be attached together in one of four positions rotated at 90 degree intervals from each other.

Supporting structures 130 and 140 may be made by methods and materials such as injection molded plastics or by formed metal or other rigid or flexible materials. Alternatively, supporting structures 130 and 140 may be formed and connected together to have more than one degree of freedom or the modules may be constructed of links that are attached together in series or in a parallel structure. The actuator 110 may be an electric DC motor with plastic gearing, or other rotational motors such as AC, brushless, or harmonic motors. The transmission may be frictional or of gear type utilizing one or more types of stages including but not limited to spur gears, worm and wormgears, planetary gears or harmonic gears. The transmission may have plastic or metal gears or a combination of plastic and metal gears. The actuator could also consist of a low speed, high torque motor such as an ultrasonic or piezoelectric motor with or without a transmission. A torque-limiting clutch may be placed between the actuator and the structure to protect the system from being over-torqued, as well as to facilitate manual posing. Although FIG. 1 illustrates a single actuator contained within the module, it will be understood that more than one actuator may be present within each module. The CPU 180 may be a 4 bit micro-controller or other 8 bit or higher micro-controller.

For the purposes herein, the module is described as having an actuator and supporting structures holding a CPU and connection plates. However, it will be appreciated that the module may take any of numerous shapes and configurations, such as those described in related co-filed application U.S. Ser. No. 09/939,368 "Robotic Toy Modular System" to Yim et al. and hereby fully incorporated by reference.

Figure 2:
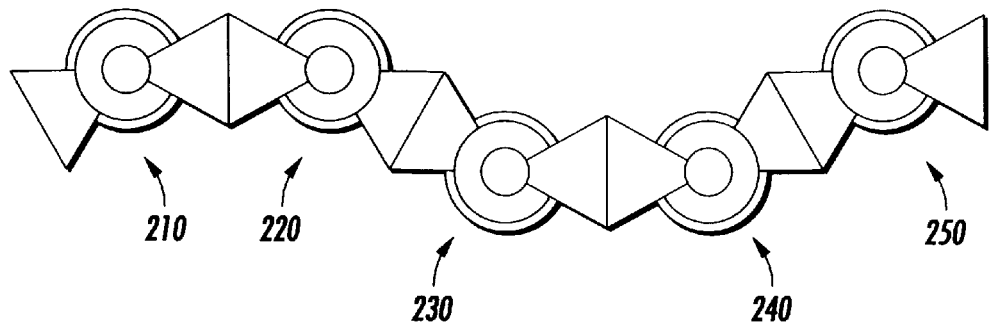
FIG. 2 illustrates one possible embodiment for a plurality of the modular elements of FIG. 1.

Referring now to FIG. 2, there is shown an embodiment of one of the many shapes it is possible to achieve by connecting the modules of FIG. 1. In this embodiment, modules 210, 220, 230, 240 and 250 are connected end-to-end to form a linear shape which may flex and move in a snake-like motion.

Figure 3:
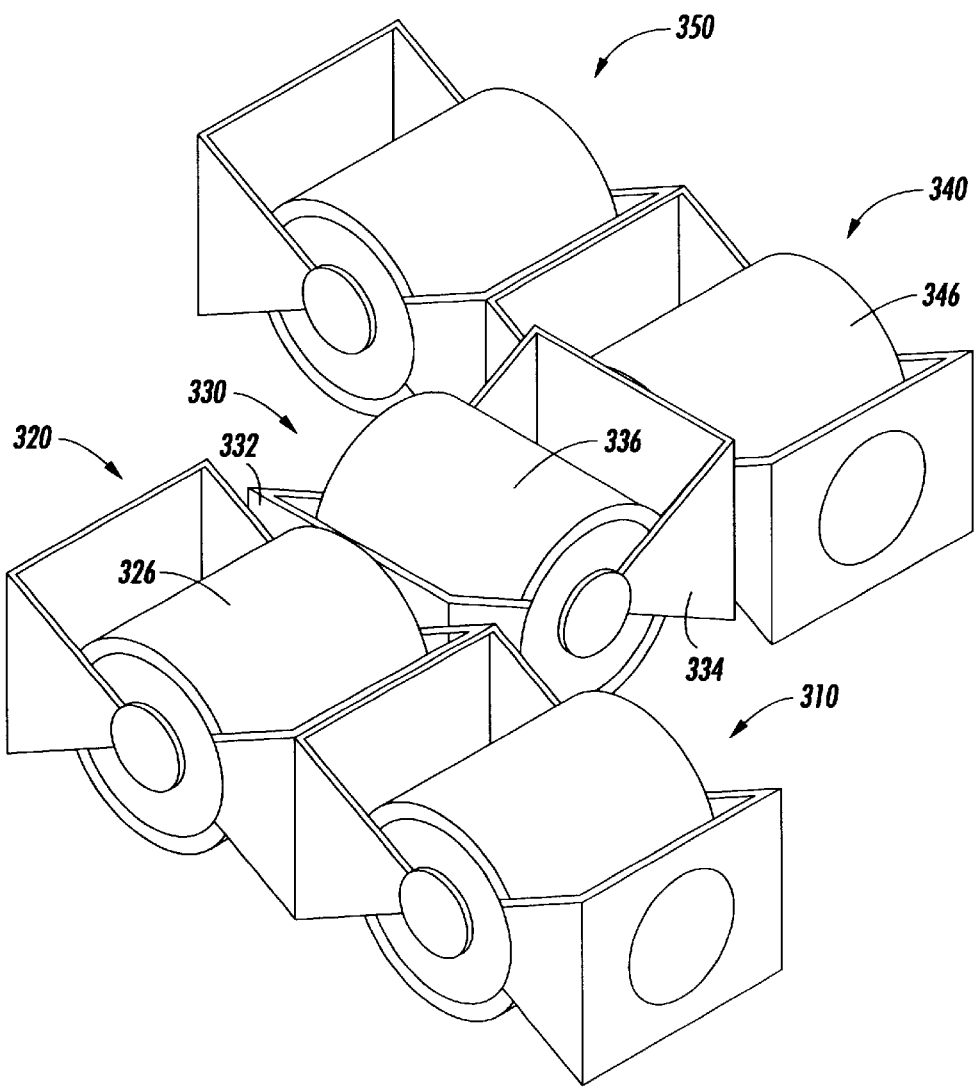
FIG. 3 illustrates another possible embodiment for a plurality of the modular elements of FIG. 1.

FIG. 3 illustrates another possible configuration, in which five modules 310, 320, 330, 340 and 350 are connected such that central module 330 connects two pairs of modules. The first pair of modules, 310 and 320, extends from one support structure 332 of module 330, while the second pair of modules, 340 and 350, extend from a second support structure 334 of module 330. In this embodiment, modules 320 and 340 may move rotationally about an axis extending through the center of actuator 336 of module 330. Module 310 may move rotationally about an axis extending through the center of actuator 326 of module 320; module 350 may move rotationally about an axis extending through the center of actuator 346 of module 340.

Figure 4:
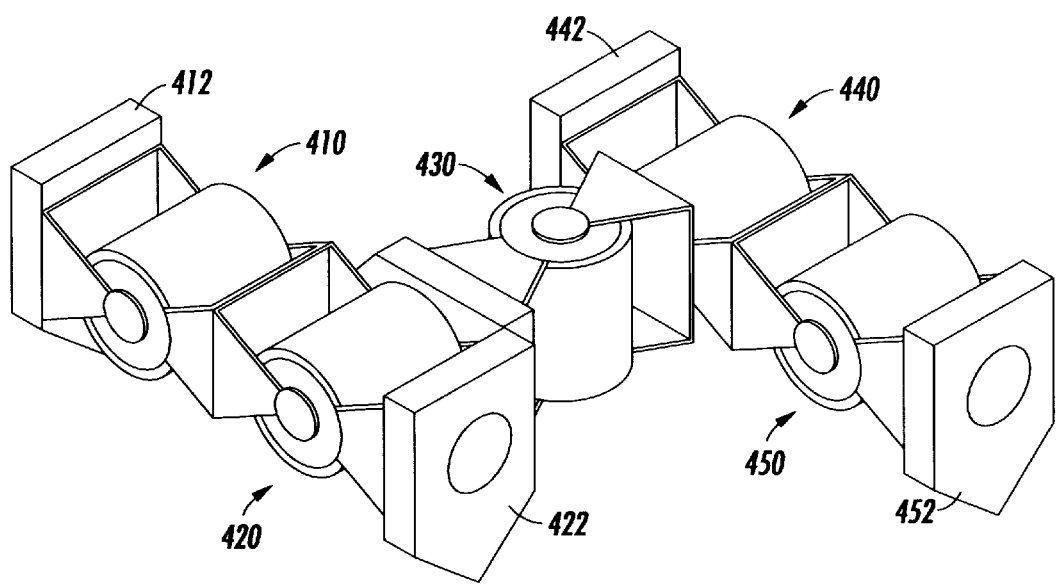
FIG. 4 illustrates another possible embodiment for a plurality of the modular elements of FIG. 1.

FIG. 4 is similar to FIG. 3 except that the central module is rotated 90 degrees. This illustrates the use of a connection plate having symmetries that allow different ways to attach modules. In FIG. 4, passive components 412, 422, 442 and 452 are attached to the ends of modules 410, 420, 440 and 450 respectively. In this embodiment the passive components allow the modules to which they are attached to function as feet and modules 410, 420, 440 and 450 to function as legs. Rotation of module 430 allows the translation of the legs; rotation of the leg modules allows the feet to be lifted from the ground. Other types of passive components permitting other functionalities could also be attached to the modules.

FIGS. 2–4 illustrate only three of many configurations which it is possible to construct using the modules described herein in any number and connection pattern. One skilled in the art will readily appreciate that with a sufficient number of modules and various types of passive components, the potential number of configurations is almost limitless.

Figure 5:
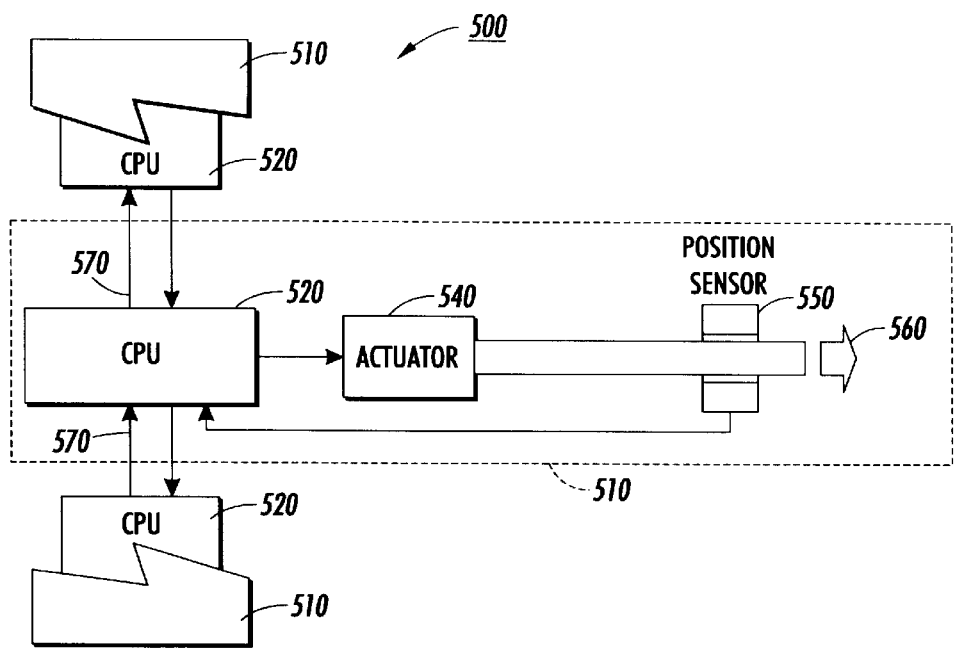
FIG. 5 is a block diagram of one embodiment of the system according to the present invention.

Referring now to FIG. 5, there is shown a block diagram of an embodiment of the system disclosed herein. The basic system 500 includes a plurality of modules 510, all of which contain a CPU 520, which may include embedded or external memory. For the purposes of clarity, the details of the configuration of this embodiment are shown on the central module only. Each module also includes actuator 540 and joint position sensor 550. CPUs 520 communicate with each other through network communication links 570, which connect to each module. Communication among the modules may be through infrared light, radio frequency transmission, or other means of communication, such as electrical signals transmitted by making electrical contact, by induced electrical signals, or by audio or vibrational signals. The position sensor senses the position of the output shaft 560 which is connected to the structure of the module. This sensor senses the motion of the output shaft whether it is driven by the actuator or whether it is back driven by motion of the structure from the environment, for example, a user moving the structure.

Figure 6:
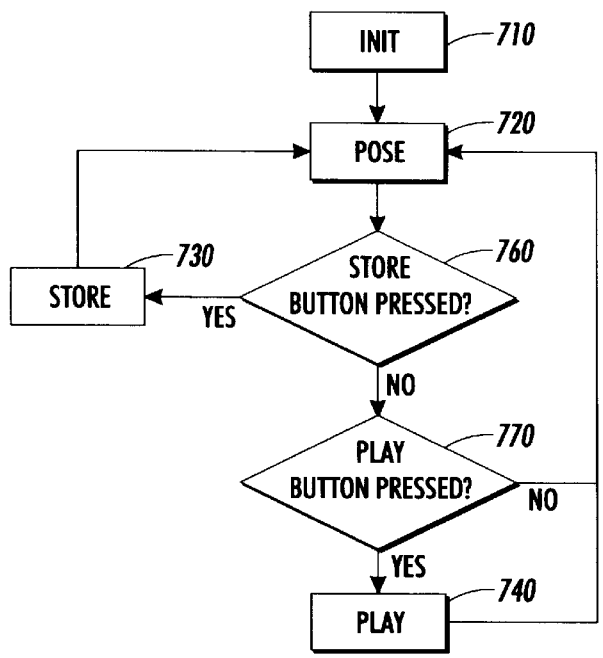
FIG. 6 is a flow chart for the embodiment of the system according to FIG. 5.

Referring now to FIG. 6, there is shown a flowchart of a programming model of one embodiment of the system disclosed herein. At step 710 programming a module is initiated with an input to the system, which may take numerous forms. For example a power-on signal may be sent to the system from an on/off control source, or a signal may be provided by movement of a hand in front of a proximity detector. Alternatively, a Hall effect sensor could provide an initiating signal when activated by a magnet, a light detector could provide an initiating signal when activated by a beam of light, or an audio sensor could provide an initiating signal when activated by a sound, such as the clapping of hands. At step 720 the operator moves, or poses, a module joint to a desired position. In the case in which many modules are connected together, the user may pose the modules by moving many modules simultaneously. This provides an intuitive, easy method to program many modules, which would be time consuming and tedious one module at a time.

At step 760 a check is made to see if the position should be stored. The input to the system to indicate a pose to be stored may be a button or force sensor on each module, or a wireless means of indicating to the modules that a state should be stored. Examples of possible wireless means include an infrared light or a radio signal that is sensed by each active module. Other possible means of indicating to the modules that a state should be stored include a magnetic signal sensed by a Hall effect sensor, or an audio signal sensed by an audio sensor. Alternatively, the system could automatically store states without the need for user input by recording states at specified time intervals. For example, every second, many times per second, or at pre-specified or on-line calculated time steps. Another possible method for storing states without the need for user input is sensing of joint motion for a specified period of time or when a change in the direction of the velocity is detected. When all joints stop moving, the state is stored as a pose.

If a pose is to be stored, then at step 730 a signal is passed through the communications means 570 to all the CPUs of the robotic joint modules in the system. Each robotic joint module reads its respective joint position sensor and stores the position in the individual module's memory as a step in the motion program This occurs simultaneously for all the modules, which is advantageous for a system of many modules. As may be appreciated, the joint position data for all the robotic joint modules may be stored in one computer in one module or a subset of the modules instead of being distributed among all of the robotic joint modules. If a single robotic joint module contains sufficient memory capability, the motion program may be stored on that module. Alternatively, the program may be stored on a removable medium. The program sequence then returns to step 720 and the sequence of steps 720, 760 and 730 is repeated When the user has completed entry of poses and is ready for the system to play back the motions that were recorded in previous steps, the play button is pressed at step 770. The input to the system to indicate poses to be played may include any of the means described above for performance of step 760. Whenever this input is indicated, the system plays back the stored motion program. The motion sequence may be modified or altered by the system. For example, the speed of execution of the motion sequence may be enhanced or reduced, or the positions may be altered through smoothing or exaggeration. The motion sequence program may have positions appended to it even after the motions are played back. This facilitates the construction of the motion sequence program, since the user may play back shorter portions of the program before adding on the final positions.

Figure 7:
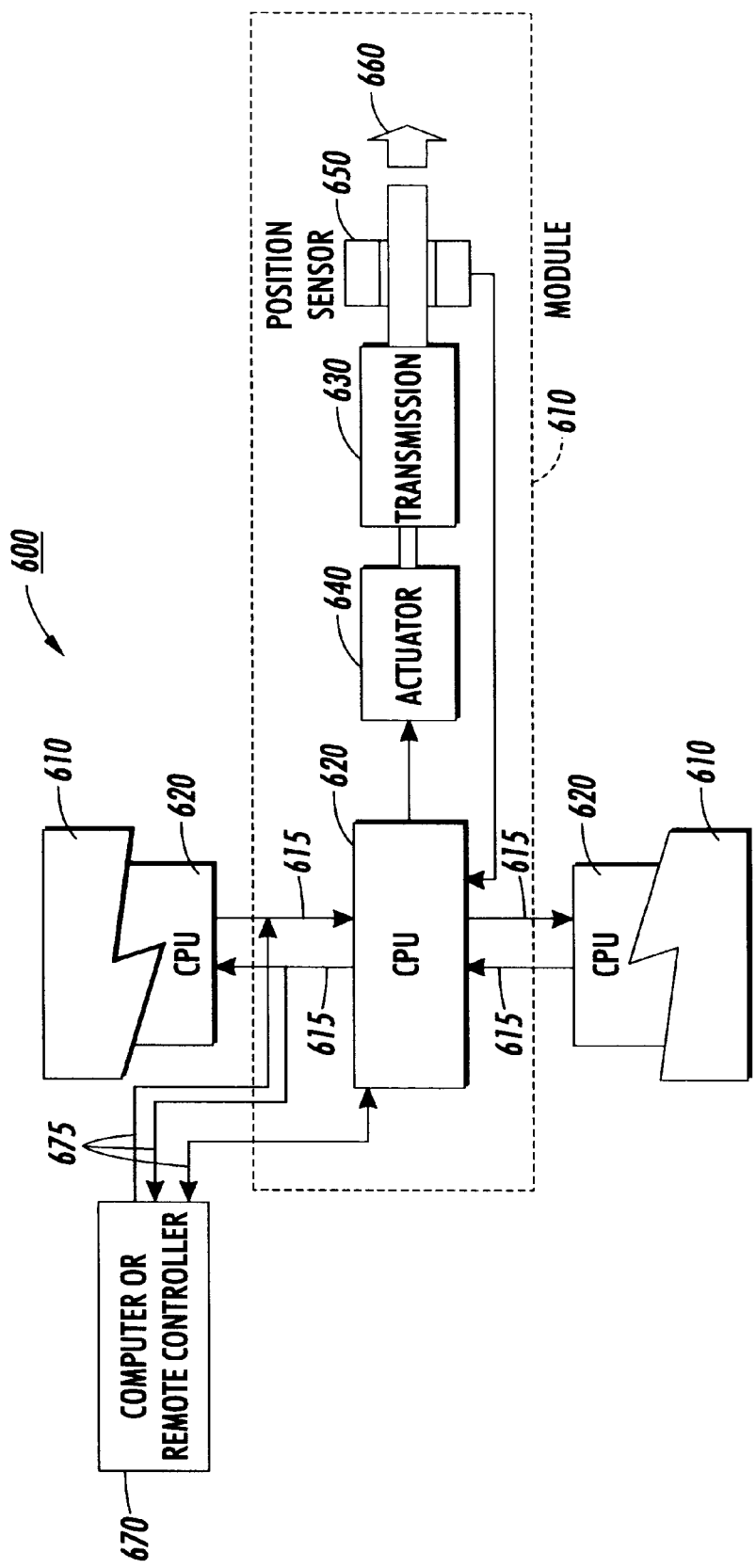
FIG. 7 is a block diagram of another embodiment of the system according to the present invention.

Referring now to FIG. 7, there is shown a block diagram of an alternate embodiment of the system disclosed herein. This embodiment includes multiple modules 610, each having CPUs 620. For the purposes of clarity, the details of the configuration of this embodiment are shown on the central module only, however, this configuration embodiment may be present in some or all of the interconnected modules of the system. The module of this embodiment includes actuator 640 and joint position sensor 650, corresponding to actuator 540 and joint position sensor 550 described hereinabove. This embodiment also features an additional transmission 630. This non-backdriveable transmission also has a torque limiting clutch to allow motion of the modules with sufficient force but no motion otherwise. This advantageously allows the system to be posed without having to continuously support the modules, which would otherwise move, possibly due to gravity or other environmental forces.

The modules communicate over communication links 615. Additionally, an optional personal computer or remote controller 670 with input devices, external to the robotic device, may be used to edit the motion program or serve as a mass storage or back-up storage device. Personal computer or remote controller 670 communicates with the system over communication links 675. The remote controller may be used to explicitly change the behavior of the modules and the system as the motion sequence program is being played back and reviewed. These changes may then either be stored and incorporated into the motion sequence program or ignored. Sensors 650 may be used as inputs to the program for initiation or indication of a step to be recorded as described above.

Figure 8:
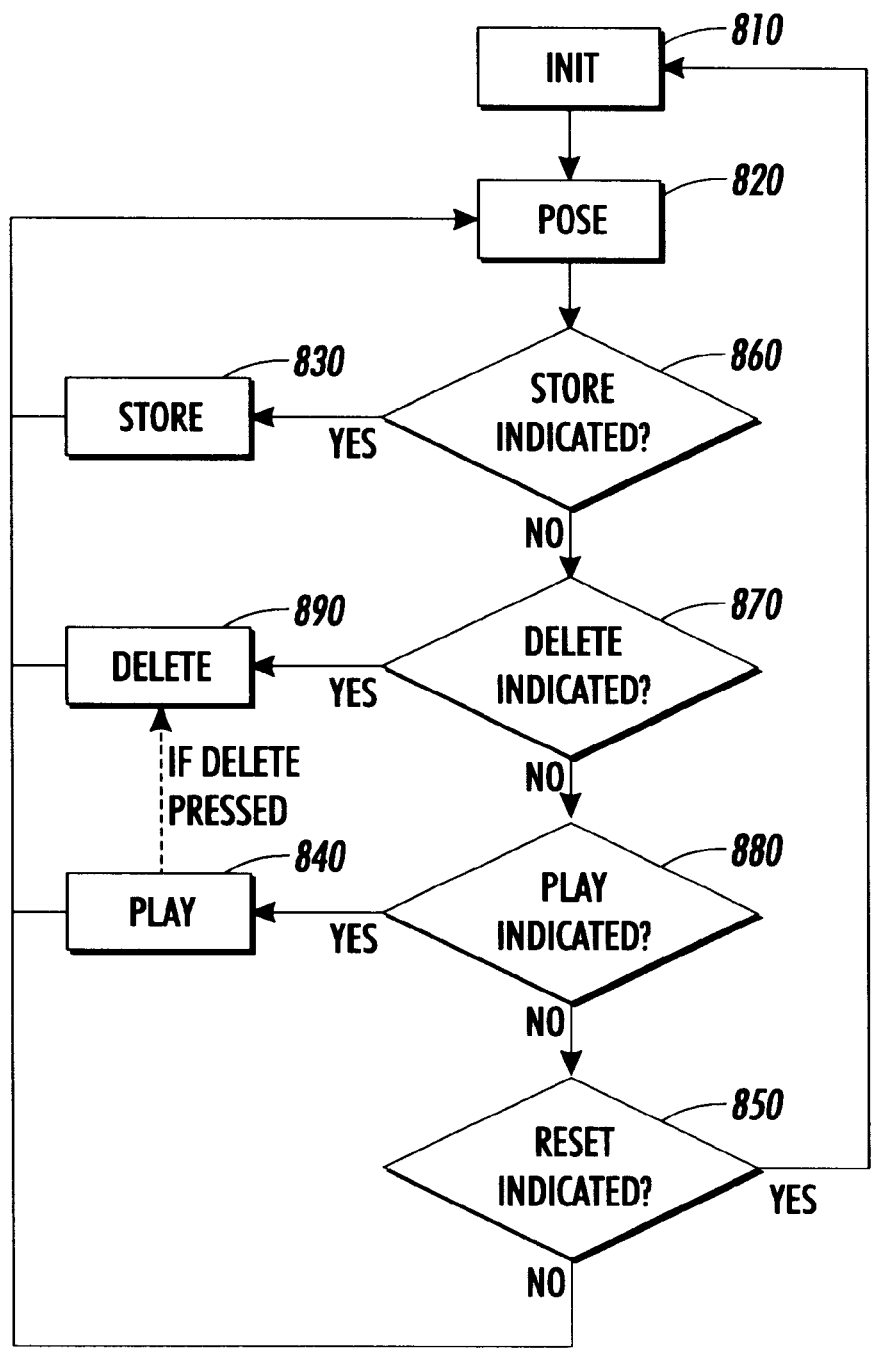
FIG. 8 is a flow chart for the embodiment of the system according to FIG. 7.

Referring now to FIG. 8, there is shown a flowchart of a programming model of another embodiment of the system disclosed herein. At step 810 programming a module is initiated with an input to the system, which may take numerous forms. For example, a power-on signal may be sent to the system from an on/off control source, or a signal may be provided by movement of a hand in front of a proximity detector. Alternatively, a Hall effect sensor could provide an initiating signal when activated by a magnet, a light detector could provide an initiating signal when activated by a beam of light, or an audio sensor could provide an initiating signal when activated by a sound, such as the clapping of hands.

At step 820 the operator moves, or poses, a module joint to a desired position. At each of steps 850, 860, 870 and 880 a check is made to determine if a signal is indicated. The input to the system for any of these indications may be a button pressed or force sensed on each module, or a wireless means of indicating to the modules. Examples of possible wireless means include an infrared light or a radio signal that is sensed by each active module. At the store indicated step 860, a decision is made by the user as to whether to store the current joint positions. Alternatively, the system could automatically store states without the need for user input by recording states at specified time intervals. For example, every second or at pre-specified or on-line calculated time steps. Another possible method for storing states without need for user input is sensing of joint motion.

When all joints stop moving, the state is stored as a pose in step 830. Storage of a position is comprised of reading a joint sensor and storing that data, for example by writing to a memory location in available random access memory (RAM), read only memory, or other non-volatile RAM.

At step 870 a determination is made as to whether a delete action is indicated by the user. If the user has indicated a delete action, the delete step 890 is executed. This may be the removal of the last step that was stored, or the last several steps or other appropriate editing actions. At reset indicated step 850 the system is reinitialize the current motion program is lost, and the programming sequence begins again. The play indicated step 880 causes step 840 to be executed, which results in the play back of the current motion program. During the playback of the current motion program, the indication steps 850, 860, 870 and 880 may still be monitored. For example if a delete is indicated, the position that the motion program is currently executing could be deleted from the motion program by jumping to step 890. As may be appreciated, there are many types of indicator or system instruction steps that may be used in addition to or in place of the steps for storing, deleting, playing and resetting described hereinabove.

One such example is storage for joint positions of subsets of modules which facilitates the building up of complex motions with large numbers of modules. A large system may be composed by building motion programs with portions of modules, then combining the groups together. One play indicator would then cause all of the subgroups to act together. If the motion programs of the subgroups were of differing lengths, several actions could occur. The shorter programs may stop motion until the longer programs reach completion; the shorter programs may repeat until the longer programs reach completion; or each step of the shorter programs could be slowed down such that all programs end simultaneously. For example, a group of modules may be posed and programmed to form a walking platform. A second group may be posed and programmed to form a swinging arm function. Attaching the two together and executing them simultaneously creates a robot that may battle another programmed robot in a robot battle competition game.

Alternative indicators could include a stop or pause indicator, a fast forward, rewind, or reverse instruction steps. Editing may be performed on the robotic system itself, on a remote unit (e.g. a hand held computer or a mobile telephone, on a personal computer, or any other source capable of reviewing a control program). Editing may take several forms, for example, stepping through a sequence of movements, stopping at a movement to be changed, and inserting, deleting, or moving the previously stored position. Alternatively a sequence of movements may be edited by uploading the program for the sequence of movements to an external computer, graphically editing the sequence, and then downloading the edited sequence to the system.

At step 840 the stored sequence of events is played. At this step the system of robotic modules may repeat the sequence of movements multiple times, for example, if a few steps of a walking gait are input as positions, then the system may walk continuously. Alternatively, the system may run the sequence once and then stop, or it may run it for a specified number of times. Each of these behaviors may be indicated through interactions with the sensors.

Once the poses are programmed into the system the control of the system between poses may be a gait control table. In such a table a sequence of behaviors controls the behavior of each module. In a simple form, such behavior could be an open loop timed motion of a module, perhaps movement of a leg from a zero degree position to a ten degree position at a specified speed. Alternatively a form of closed loop feedback from a position or joint angle sensor on each module could servo movement from one position to another on the table. Each module may begin at the top of the table and move from one behavior to the next in the table until the end of the table is reached, when the cycle starts over.

For a locomotion gait, a table may be structured specifying angles for each of the joints of the module at a specified elapsed time. The modules interpolate the joint angles during the time between each specified time in the table. For the case of locomotion gaits, the gait is repeating, so only the non-repeating portion of the table needs to be stored as the program for the gait. For the system described herein, the program is distributed among the modules such that each module only stores the portion of the table that corresponds to its own movements. This requires less program memory space for each module, which enables the system to store longer and more complex programs. Additionally, the system becomes scalable with regards to program space. As more modules are added, the program space increases at the same rate that the table increases. If the control program were stored in only one computer, or the entire program for all modules were stored in every module, as modules are added the size of the table or the control program would grow linearly, but the program space would remain unchanged.

For the distributed system with separate modules, each with its own actuator and controller, to perform optimally, the controllers must be coordinated This may be achieved by the system indicating a signal to synchronize the controllers. The signal may be a one-time event such as power being provided to the system, or a button on one module may be pressed, thereby sending a signal to all the other modules. Alternatively, the controller of one of the modules may send a signal under its own program, its own interpretation of its own sensors, or a combination of information obtained from communicating with other modules about the system's state. The signal may also be a continuing regular signal such as the tick of a clock to maintain continual closed loop synchronization, or it may be non-regular depending on other system events.

As may be appreciated, the same motion program that is programmed in to one set of modules may be used to control a plurality of modules. For example a set of motions for a dance may be programmed into one set of modules. This same motion program could be used such that a dance troupe of many groups of robotic modules will dance together. A single wireless indicator may be used so that they run in a synchronized fashion. A repeating gait may be used to form a parade of waling robots.

While the present invention has been illustrated and described with reference to specific embodiments, further modification and improvements will occur to those skilled in the art. "Code" as used herein, or "program" as used herein, is any plurality of binary values or any executable, interpreted or compiled code which can be used by a computer or execution device to perform a task. This code or program can be written in any one of several known computer languages. A "computer", as used herein, can mean any device which stores, processes, routes, manipulates, or performs like operation on data. It is to be understood, therefore, that this invention is not limited to the particular forms illustrated and that it is intended in the appended claims to embrace all alternatives, modifications, and variations which do not depart from the spirit and scope of this invention.

What is claimed is:

1. An assemblage of robotic joint modules for a robotic toy construction system, the assemblage comprising:
    a plurality of robotic joint modules, each said robotic joint module having memory capability, an actuator, a joint sensor, communications means, and a central processing unit; and
    a distributed control unit defined at least in part by a plurality of individual central processing units, wherein each one of said robotic joint modules includes at least one said central processing unit.

2. The assemblage of robotic joint modules according to claim 1, wherein said robotic joint modules further comprise an audio/visual display.

3. The assemblage of robotic joint modules according to claim 1, wherein said robotic joint modules further comprise a plurality of sensing devices.

4. A method for programming an assemblage of robotic joint modules for a toy construction system, wherein each said robotic joint module includes a central processing unit, memory capability, an actuator, a joint position sensor, and communication means, the method comprising:
providing an initiating signal to the assemblage of robotic joint modules;
moving at least one robotic joint module to a first desired position;
storing each said first position within each corresponding said central processing unit of each said robotic joint modules;
moving at least one robotic joint module to a second desired position;
storing each said second position within each corresponding said central processing unit of each said robotic joint module; and
repeating the sequence of moving selected robotic joint modules to selected desired positions and storing each said desired position within each corresponding said central processing unit of each said robotic joint module until a full sequence of desired positions is obtained.

5. The method for programming an assemblage of robotic joint modules according to claim 4, further comprising editing the sequence of movements.

6. The method for programming an assemblage of robotic joint modules according to claim 4, wherein storing said position comprises receiving a signal from a sensor.

7. The method for programming an assemblage of robotic joint modules according to claim 6, wherein storing said position comprises receiving a signal from an infrared sensor.

8. The method for programming an assemblage of robotic joint modules according to claim 6, wherein storing said position comprises receiving a signal from a radio signal sensor.

9. The method for programming an assemblage of robotic joint modules according to claim 6, wherein storing said position comprises recording a position at specified time intervals.

10. The method for programing an assemblage of robotic joint modules according to claim 6, wherein storing said position comprises sensing the cessation of motion of the robotic joint module.

11. The method for programming an assemblage of robotic joint modules according to claim 4, further comprising a gait control table for controlling the assemblage of robotic joint modules between said poses.

12. The method for programming an assemblage of robotic joint modules according to claim 4, wherein the assemblage of robotic joint modules comprises subsets of modules.

13. The method for programming an assemblage of robotic joint modules according to claim 12, wherein each said subset of robotic joint modules is programmed independently of each other said subset of robotic joint modules.

14. The assemblage of robotic joint modules according to claim 1, further including a non-backdrivable transmission with torque-limited clutch.

15. A method for coordinating motions of an assemblage of robotic joint modules for a toy construction system, wherein each said robotic joint module includes a central processing unit, memory capability, an actuator, a joint position sensor, and communication means, the method comprising:
programming each robotic joint module with its own sequence of positions;
providing a signal to all robotic joint modules in the assemblage simultaneously;
interpreting said signal by each of the central processing units included within each of the robotic joint modules; and
directing each robotic joint module to execute its own said sequence of positions simultaneously with the other robotic joint modules in the assemblage of robotic joint modules.

16. The method for coordinating motions of an assemblage of robotic joint modules for a toy construction system according to claim 15, wherein said sequence of positions is stored in one module and communicated to each of the robotic joint modules during execution of the sequence of positions.

17. The method for coordinating motions of an assemblage of robotic joint modules for a toy construction system according to claim 15, wherein the sequence of positions is stored in subsets of robotic joint modules.

18. A method for coordinating motions of multiple assemblages of robotic joint modules for a toy construction system wherein each said robotic joint module includes a central processing unit, memory capability, an actuator, a joint position sensor, and communication means, the method comprising:
programming a first assemblage of robotic joint modules with a sequence of positions;
providing a signal from the first assemblage of robotic joint modules to other assemblages of robotic joint modules;
interpreting said signal by each of the central processing units included within each of the robotic joint modules within each said other assemblages of robotic joint modules; and
directing each said other assemblages of robotic joint module to execute said sequence of positions.

* * * * *